UNITED STATES PATENT OFFICE.

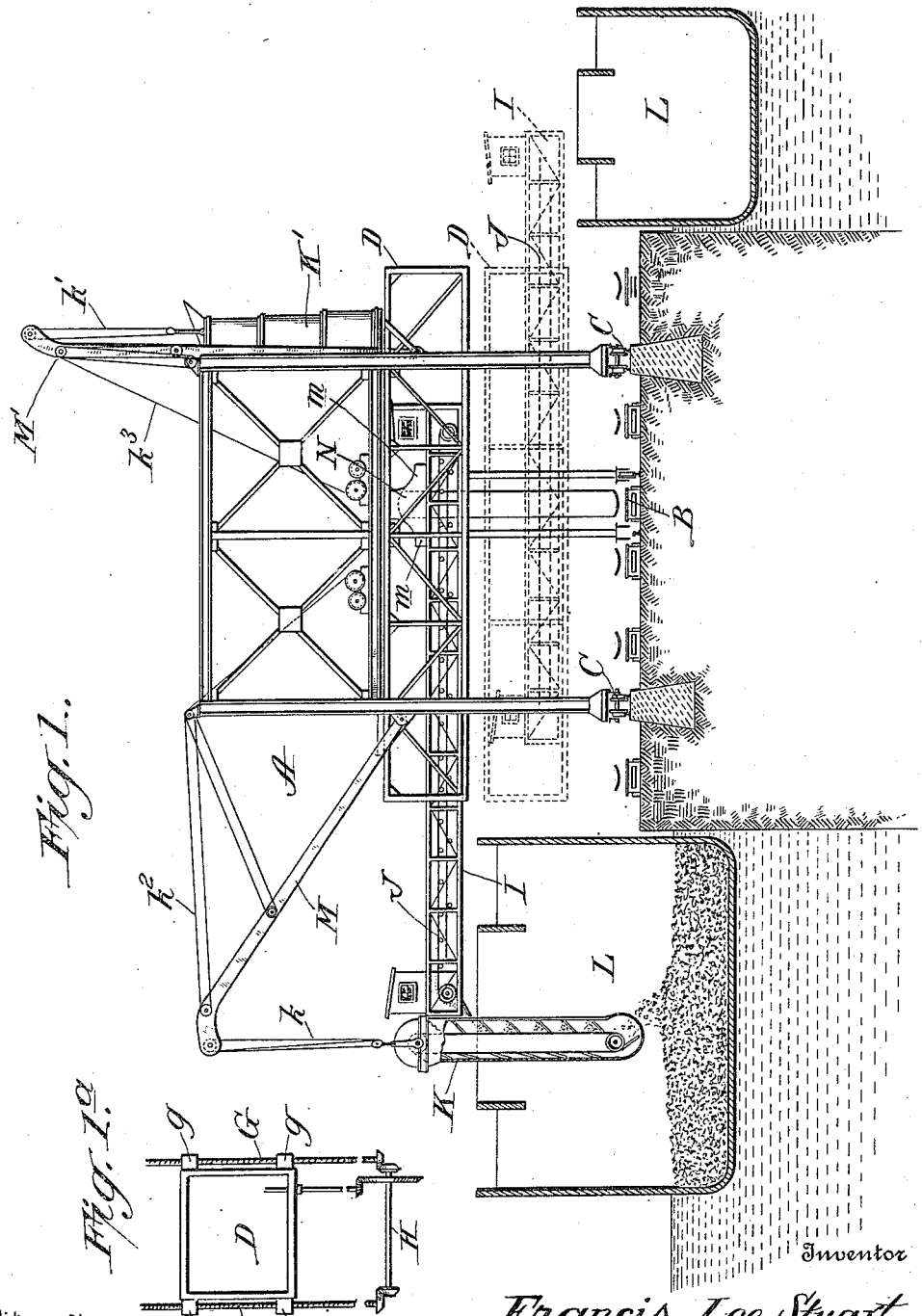

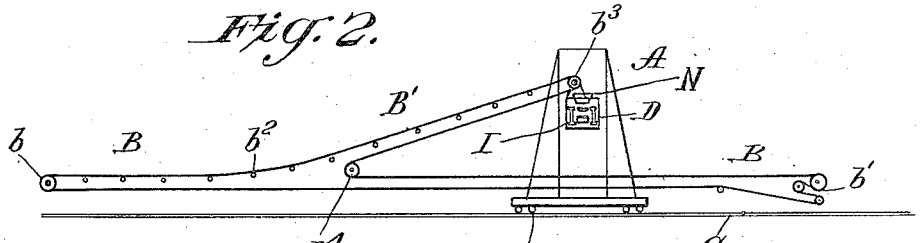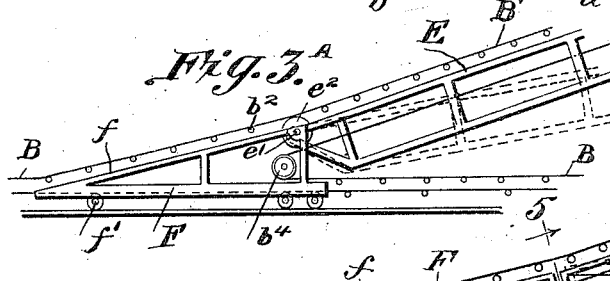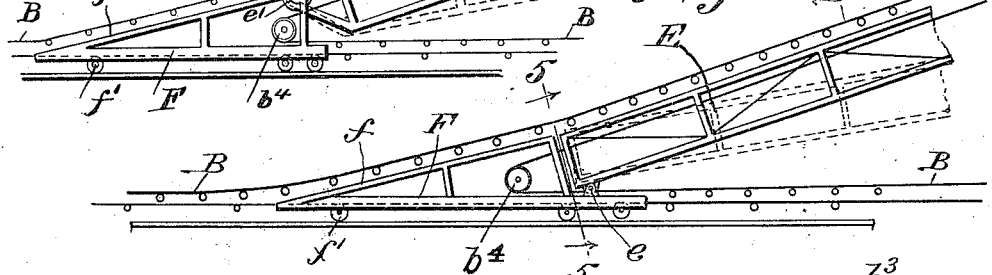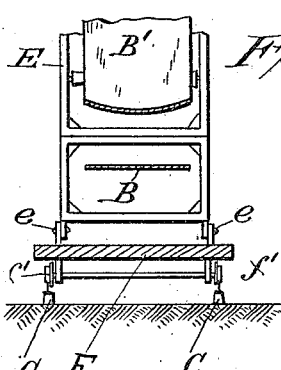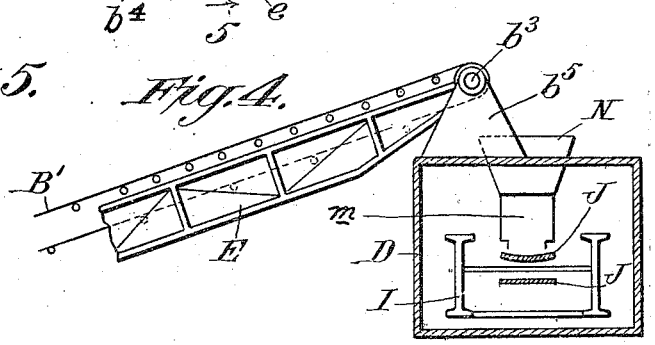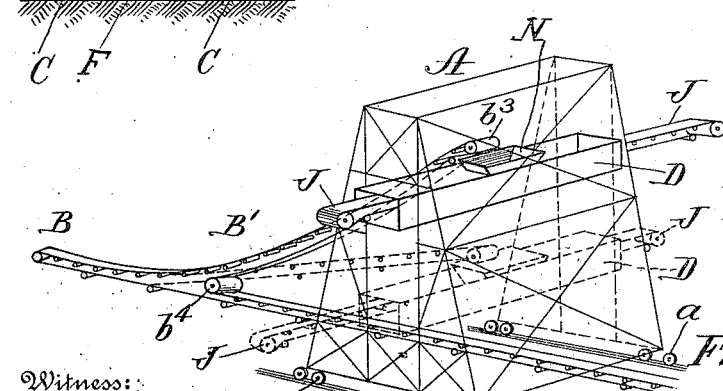

FRANCIS LEE STUART, OF BALTIMORE, MARYLAND.

LOADING APPARATUS.

1,192,016.  Specification of Letters Patent.  Patented July 25, 1916.

Original application filed October 13, 1915, Serial No. 55,620. Divided and this application filed April 7, 1916. Serial No. 89,595.

*To all whom it may concern:*

Be it known that I, FRANCIS LEE STUART, a citizen of the United States, residing in Baltimore, Maryland, have invented certain new and useful Improvements in Loading Apparatus, of which the following is a specification.

In my application for Letters Patent of the United States No. 55,620, filed October 13, 1915, I have shown some improvements in loading and storing apparatus in which means is provided for transferring material being handled from cars or other carriers to conveyers which deliver it to storage bins or piles or to receiving carriers, such as ships, barges, or other vessels or carriers. Such apparatus, generally stated, comprises means for transferring the material from loaded cars to conveyer belts, some of which carry the material to bins and others to what are called loading towers which are movable to any desired position and each of which is equipped with a conveyer which receives material entering the tower and delivers it to a chute, lowerator or other downwardly moving conveyer which deposits the material in a vessel or elsewhere if desired.

The application for this patent is a division of said application of October 13, 1915 and the claims herein are confined to the novel features of the towers above referred to.

Each of the loading towers is equipped with a vertically adjustable cage carrying a horizontally adjustable "shuttle" provided with a conveyer which receives the material entering the tower and delivers it to a chute, lowerator or other downwardly moving conveyer which deposits the material in a vessel or elsewhere if desired. The chute or lowerator is swung from a boom on which it is vertically adjustable and which is itself movable upwardly, outwardly and inwardly to accommodate different conditions.

The main conveyer belt has an inclined looped portion extending upward from the level of the main portion of the belt and this loop is supported by a frame connected at its lower end to a truck with which it has a pivotal connection, while the upper end of the frame is pivotally connected with the cage and delivers to a receiving hopper carried thereby. The arrangement is such that as the cage is raised and lowered to different horizontal planes the loop-supporting frame is correspondingly moved in such way that the upper delivery end of the loop always maintains the same in proper relation to the receiving hopper while the belt with its looped portion is maintained in proper operative condition.

My improvements are illustrated in the accompanying drawings in which,

Figure 1 shows an end elevation of a loading tower and illustrates the manner in which the vertically adjustable shuttle cage supports the horizontally adjustable shuttle equipped with a belt conveyer which delivers to a lowerator carried by an adjustable boom. Fig. 1$^a$ is a detail view illustrating conventionally mechanism which may be employed for raising and lowering the cage. Fig. 2 is a diagram illustrating particularly the relation of the tower and its shuttle cage to the main conveyer belt. Fig. 3 is a detail view showing the lower portion of the loop-supporting frame and the truck to which it is pivotally connected. Fig. 3$^A$ is a detail view showing a modified way of connecting the lower portion of the loop-supporting frame to the truck. Fig. 4 is a detail view of the upper portion of the loop-supporting frame showing how it is pivotally connected with the shuttle cage. Fig. 5 is a view on an enlarged scale and in section on the line 5—5 of Fig. 3. Fig. 6 shows diagrammatically and in perspective the relation of the tower and its shuttle cage with the conveyer belt.

The relative arrangement of one of the main conveyer belts B with the loading tower A is well shown in Fig. 2. The tower comprises a frame mounted on wheels $a$ arranged to move from place to place on a track C. The conveyer B comprises an endless belt traversing pulleys $b$, $b'$ at opposite ends of the conveyer and supported suitably by idler rollers wherever required. The belt has an upwardly inclined looped portion B' supported by idlers $b^2$ and traversing an upper guide pulley $b^3$ and a lower guide pulley $b^4$. The pulley $b^3$ is supported in bearings on the cage D which may be raised and lowered in the tower in the manner hereinafter described.

As shown in Figs. 3, 4 and 5 the looped portion of the belt is supported by a truss or frame E, the lower end of which is hinged or pivotally connected at $e$ to a truck F connected to move with the tower A and having an inclined upper portion $f$ interposed between the inclined and straight portions of the belt. The truck is supported by wheels $f'$ adapted to move on the track C, while the truss or frame E is vertically adjustable to different angular positions about the pivot $e$ as indicated by dotted lines in Fig. 3. The inclined portion $f$ of the truck affords means for holding the belt properly at the part thereof which merges from a straight to an inclined part. Instead of pivoting the frame E to the truck F in the manner shown in Fig. 3. i. e., by a pivot located below the frame and on the lower part of the truck I may join the frame to the truck in the manner shown in Fig. 3$^A$. In this case the pivot $e'$ is located where the upper portion of the lower end of the frame joins the adjacent upper end of the inclined portion $f$ of the truck and the pivot shaft carries a roller $e^2$ on which the belt B bears. In this way the belt is supported by the roller to whatever extent the frame E be adjusted and is most efficiently guided thereby in the proper direction.

As before stated, the upper end of the loop B' traverses a pulley $b^3$ and this pulley, as indicated in Fig. 4, is supported in suitable bearings in brackets $b^5$ mounted on the cage D which latter is so supported in the tower that it may be raised and lowered to any desired horizontal plane. Any suitable mechanism may be employed for this purpose. By way of example, I have shown in Fig. 1$^a$ screw-shafts G extending through lugs $g$ projecting laterally from the cage and geared to suitable power-driven mechanism H. Within the cage is mounted a shuttle I which is adjustable horizontally in the cage and is equipped with a conveyer belt J which may be operated in any suitable way and which delivers to a lowerator K or a chute K', or to any other suitable device for conveying material to a vessel L or other receptacle. The lowerator K is suspended by tackle $k$ from a boom M which may be raised and lowered by tackle $k^2$, and the chute K' is similarly suspended from a boom M' by tackle $k'$ and the boom may be raised and lowered by tackle $k^3$. Of course other means may be employed for adjusting the lowerator, chute and booms. I have shown conventionally means for these purposes. It will be understood that a chute, lowerator or other suitable conveyer may be used on either or both booms, or material may be delivered directly from the end of the shuttle to its final destination. The details of the lowerator K are not herein described in detail as they are more fully shown and described in my application for patent above mentioned.

The main conveyer belt is operated in the usual way and as more fully described in my before mentioned application, and the upper end of the looped portion thereof delivers to a hopper N carried by the cage D. This hopper preferably connects with chutes $m$ arranged over the conveyer belt J.

The tower may be moved from place to place on the track C alongside of a barge or other vessel, or near any other object to which it is desired to deliver the material being conveyed. This may be done without disturbing the proper condition of the conveyer belt which is reeved with the pulleys $b^3$, $b^4$ in a manner well known to those skilled in this art. The cage D may be raised in any suitable way to any desired elevation within reasonable limits and the shuttle I may be extended horizontally in either direction from the cage so that the shuttle conveyer J may deliver to any desired place on either side of the tower. The upper end of the looped portion of the main conveyer belt is so connected with the cage that it is raised and lowered with the cage without changing its relation to the receiving hopper of the cage, and therefore the tower may be moved back and forth on the track and the cage may be raised and lowered to any desired extent without in any way disturbing the operative condition of the main conveyer.

It will be observed that the apparatus is so organized that there is a minimum amount of breakage as the material passes gently from the main conveyer to the shuttle conveyer and said shuttle conveyer delivers with a minimum amount of breakage to the lowerator, the discharge end of which may be placed close to the receptacle to which it delivers.

I claim as my invention:

1. Loading apparatus comprising a tower, a shuttle cage adjustable vertically in the tower, an extensible conveyer carried by the cage, a main conveyer belt having a looped portion delivering to the cage conveyer and a frame supporting said looped portion of the belt having a pivotal connection with the cage and which is raised and lowered therewith.

2. Loading apparatus comprising a tower mounted to move from place to place, a vertically adjustable cage therein, an extensible conveyer carried by the cage, a hopper in the cage delivering to said conveyer, an endless conveyer belt having a looped portion delivering to said hopper and a supporting frame for said loop pivotally connected with the cage above the hopper and having a pivotal support at its lower end.

3. Loading apparatus comprising a tower mounted to move from place to place, a horizontally arranged conveyer within the tower and vertically adjustable to different horizontal planes, a main conveyer belt having a looped portion delivering to said conveyer, a frame supporting said loop and which is adjustable vertically to different horizontal planes, and a truck to which the lower end of said loop-supporting frame is pivotally connected.

4. Loading apparatus comprising a tower mounted to move from place to place, a horizontally arranged conveyer within the tower and vertically adjustable to different horizontal planes, a main conveyer belt having a looped portion delivering to said conveyer, a frame supporting said loop and which is adjustable vertically to different horizontal planes, a truck to the upper part of which the lower end of said loop-supporting frame is pivotally connected, and a roller supporting the belt adjacent said pivotal connection.

5. Loading apparatus comprising a tower mounted to move from place to place, a main conveyer belt having a looped portion delivering to the upper portion of said tower, a frame for supporting said belt, a truck mounted to move from place to place and having an inclined upper portion, and a pivotal connection between said truck and the lower end of the loop-supporting frame.

6. Loading apparatus comprising a tower movable from place to place, a cage vertically adjustable in the tower, a shuttle mounted in the cage and adjustable laterally therein, a conveyer carried by said shuttle, a main conveyer belt delivering to the shuttle conveyer, a lowerator, a vertically adjustable boom from which it is suspended, and means for raising and lowering the lowerator.

In testimony whereof, I have hereunto subscribed my name.

FRANCIS LEE STUART.

Witnesses:
 E. R. SHARKS,
 A. H. SCHAEFFER.

Copies of this patent may be obtained for five cents each, by addressing the "Commissioner of Patents, Washington, D. C."